United States Patent [19]
Ljungdahl et al.

[11] 3,771,876
[45] Nov. 13, 1973

[54] PRODUCING A PLANE OR CONICAL OPTICAL REFERENCE SURFACE

[76] Inventors: Erland Samuel Ljungdahl, 9, Fafnerstigen; Lars Axel Ekström, 11, Stallbacken, both of Djursholm, Sweden

[22] Filed: Nov. 17, 1971

[21] Appl. No.: 199,699

[52] U.S. Cl............... 356/138, 356/149, 356/153, 356/250, 33/286, 33/291, 350/285, 350/287
[51] Int. Cl. .......................................... G01b 11/26
[58] Field of Search.................... 356/138, 149, 172, 356/153, 250, 148; 33/291, 345, 286

[56] References Cited
UNITED STATES PATENTS

| | | | |
|---|---|---|---|
| 3,588,249 | 6/1971 | Studebaker | 356/172 |
| 3,635,565 | 1/1972 | Colson | 356/172 |
| 3,013,464 | 12/1961 | Keuffel et al. | 33/345 |
| 3,619,069 | 11/1971 | Alexander | 356/138 |
| 3,471,234 | 10/1969 | Studebaker | 356/138 |
| 3,469,919 | 9/1969 | Zellner | 356/138 |
| 3,617,131 | 11/1971 | Taguchi | 356/149 |
| 3,462,845 | 8/1969 | Matthews | 33/291 |

*Primary Examiner*—Ronald L. Wibert
*Assistant Examiner*—Paul K. Godwin
*Attorney*—Elliott I. Pollack

[57] ABSTRACT

Apparatus for producing a plane or conical optical reference surface by deflection of a primary light beam provided by a light source, with a beam being deflected by a rotatable light deflecting means. The light source is suspended as a pendulum and directs the light beam in a vertical direction towards the light deflecting means. The deflected light beam exists through a conical cylindrical prism if redeflection to produce a conical reference surface is desired. The light source is suspended by a flexible means comprising at least two members which are respectively flexible in directions perpendicular to each other, thereby permitting the pendulating of the light source means in any direction and providing also for the energization of the light source through the flexible means which may be electrically conductive. A method of initially aligning the primary light beam with the vertical axis is also shown, where a free liquid surface such as mercury is used to retroreflect the beam.

10 Claims, 1 Drawing Figure

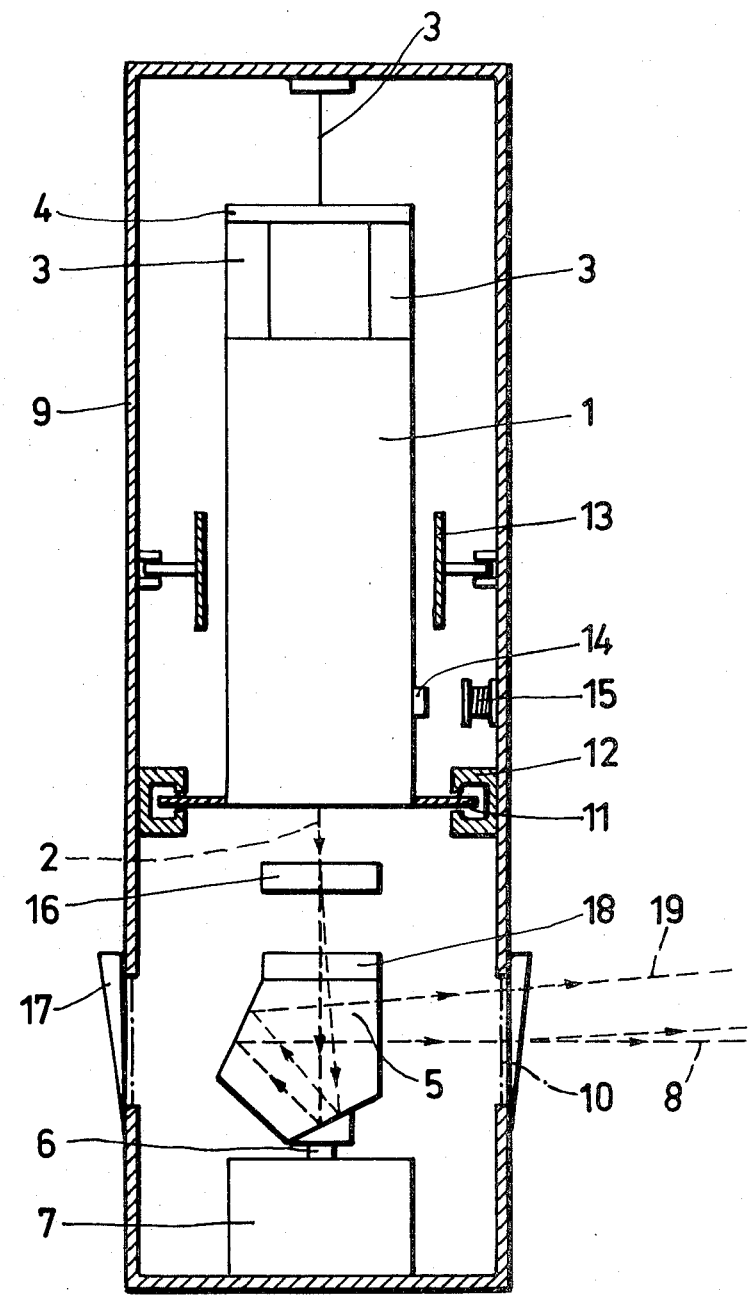

PRODUCING A PLANE OR CONICAL OPTICAL REFERENCE SURFACE

BACKGROUND OF THE INVENTION

In excavation work, construction, building and other kind of work, it is necessary to have access to measuring reference points or measuring reference planes for carrying out and controlling the work. These points or planes heretofore have been obtained by utilizing a spirit level, sighting, stretching a wire between two fixed points or between a fixed point and a plumb, by sighting through a leveling instrument or theodolite, by length measuring from primary reference or reference planes, and by other methods. All of these methods involve disadvantages indifferent aspects, as they require assistance, transport, or other manipulations, which are time-consuming or incur expense.

SUMMARY OF THE INVENTION

This invention relates to an optical arrangements, by which a great number of reference points or a continuous plane reference surface or a cone-shaped reference surface, with its perpendicular axis, respectively, in vertical, horizontal or any optional direction, can be obtained by means of a directed or omnidirectionally sweeping narrow light beam with high intensity. The invention is characterized in that the primary light beam is produced by a device including a light source and possibly lenses, shutters and the like, collecting the light into one narrow beam, which devices is suspended as a pendulum adapted to move in two planes and so arranged that the primary light beam with the pendulum in its position of rest is directed vertically Or substantially vertically with a known deflection from the vertical direction.

BRIEF DESCRIPTION OF THE DRAWING

The invention is described below by way of an embodiment adapted for producing plane and cone-shaped surfaces with the perpendicular axis being vertical or substantially vertical, reference being made to the accompanying schematic drawing.

DETAILED DESCRIPTION OF THE PREFERRED EMBODIMENTS

A pulsating or continuous laser or other light source (1) emitting a narrow intensive beam of visible light, or radiation which can be made visible by wavelength-changing spectacle, or by choosing a special, for example fluorscent, radiation surface, is suspended as a pendulum in a stand or other mounting means in a bearing device easily movable in two planes perpendicular to each other. The light source is mechanically so balanced that the light beam (2), after possible pendulum oscillations have ceased, is directed vertically downwards with an accuracy determined by the bearing friction and balancing, which accuracy is sufficiently great to ensure that the deflection of the beam center from the exact vertical line is smaller than the spread angle of the beam. To achive this accuracy, the bearing can be designed, for example, in the form of thin metal tapes (3) arranged perpendicularly one relative to the other with an insulating intermedaite piece (4) so that siad tapes, besides being easily movable in two planes, also can serve as electric lead-in lines, so that no separate electric lead-in lines ar needed which may introduce undesired forces.

For certain applications it may be sufficient to direct the light beam by means of spirit level or bubble, which can be adjusted to the desired angel relative to the light beam.

The vertical light beam thus obtained is directed onto a prism (5) or a double-mirror device, preferably of the well-known type reflecting a light beam at a constant angle so that the beam emerges, for example, in a direction 90° from the direction of incidence, independently of small changes in the direction of the prism or mirror device in relation to jthe vertical line. The prism or mirror device is mounted on a vertical axle (6) in the extension of the light beam, which axle can be caused to rotate by a motor (7) or other turning means. Consequently, the light beam (8) sweeps aboiut the vertical line produced by the light beam in the pendulum and produces a horizointal plane reference surface. If the rotating axle is mounted and directed accurately, the prism or double-mirror can be replaced by a single mirror.

The light beam sweeping about the vertical line produces on the objects it meets a light line having the width of the beam. The light line can be observed easiy, for example on walls, distance members etc., possibly by means of special wavelength fitlering or wavelength changing spectacles or by coating the radiated surfaces with a wavelength changing material adjusted to the wavelength of the radiation, for example fluorescent material.

The pendulum device, which must be easily movable, should be protected against disturbing forces, for example air streams, by an external tubular casing (9), which may be designed as a part of the stand or movably mounted therein. The external casing is provided with a slot-shaped light aperture (10) at the same height as the rotating light beam. The aperture and the devices inside thereof can be protected by a transparent shell and during transport by a tubular sleeve mounted displaceably on the outer surface of the protective casing.

The motor or turning means for the prism (mirrors) may be secured either in an extension of the light source pendulum or within the protective casing. In the latter case, the protective casing must be directed vertically with an accuracy at least sufficiently high that the light beam impinges upon the prism or the mirror system.

To prevent the pendulum from oscillating for too long a time after a disturbance from its state of equilibrium, the pendumlum can be provided with a damping device, for example in the form of a container with a viscoius liquid or in the form of a conductive non-magnetic plate (11) mounted concentrically about the pendulum at a suitable distance from its suspension, preferably about the lower portion of the pendulum, and a plurality of permanent magnets (12) may be secured in the protective casing in such a manner that their magnetic fluxes pass through said plate.

Between the protective casing and the pendulum, protective buffers and/or locking means (13) are placed to reduce the stresses on the light source and other parts during transport and other handling.

In using the apparatus, the protective casing is first directed substantially vertically, whereafter, via a stand, the casing is placed against the support, which may be a floor, a pillar etc. After a short time, the pendulum assumes a vertical direction wherein, in the embodiment in which the turning means is mounted within the protective casing, the light beam impinges upon the prism or mirror system. If the light beam does not impinges upon the prism or mirror system in a satisfactory way, the vertical direction of the protective casing can be adjusted until such impingement takes place.

Adjustment of the light beam so as to make it accurately vertical before impingement upon the prism can be effected by temporarily removing the turning means with the prism and replacing it with a container having a free liquid surface, preferably mercury, whereby the light beam will be reflected exactly to its point of origin. This control method is more accurate in the embodiment in which the motor is mounted within the protective casing, because then the pendulum at the time of adjustment need not be subjected to interferences which may disturb the equilibrium.

For certain purposes, one may desire to establish a slightly inclined reference plane, for example in the construction of roads, garage slopes and the like. This can be achieved either by deflection of the horizontal light beam by a straight prism by a mirror in front of the light aperture in the protective casing, or by inclining the pendulum to the necessary degree. A simply adjustable known inclination can be obtained by fastening onto the lower portion of the pendulum a piece of ferromagnetic material (14) and mounting in the protective casing one or more magnetic coils (15) supplied with electric current. By adjusting the current through the coils, the lateral force and thereby the size and direction of the inclination can be adjsuted in a simple way. In this embodiment, it is to be observed that possible damping magnets are arranged so that their leakage fields do not give rise to errors. The method requires the deflection device for the light beam to be mounted on the pendulum. An inclined reference plane can also be obtained when the vertical light beam is deflected by a nonrotary prism (16) before the rotating deflection.

It may happen that one desires a slightly conical reference system, for example when laying a floor on which water runs off to a drain pit, This can be established by means of a conecylindric prism (17) about the light aperture of the protective casing, or alternatively completion (18) or re-adjustment of the rotating prism or mirror device, so that it renders a deflection of the vertical beam different from 90°.

Several other embodiments and variants are possible. An inclined reference plane, for example, can be obtained by two indentical prisms (16) arranged in the vertical light beam in such a way, that they can be rotated independently of each other about an imagined vertical axis coinciding with the light beam. The difference between the set angle of rotation of the prisms then determines the size of the inclination of the reference plane produced, and the total of the angle of rotation determines the direction of the inclination of the reference plane.

Anothr method is to arrange, instead of the aformentioned prism pair, both a centered lens (16) with great focal width and an eccentrically displaceable lens (16) with same focal width but with inverse sign. The size of a displacement from the centering of said latter lens determines the size of the inclination of the reference plane, and the direction of the displacement determines the direction of the inclination.

Similar arrangements can be made to rotate with the deflection device whereby a conical reference surface is produced. A combination of these arrangements produces a conical surface with adjustable conicity and axis inclination (19).

The above arrangements for effecting inclination and/or conicity of the reference system can also be introduced into the previously described embodiment, in which the light source is rigidly connected with the protective casing and aligned by a spirit level or bubble.

It is possible by means of simple accessory and supplementary devices to satisfy different practical requirements. It may be practical, for example, to provide the pendulum or protective casing with a bubble for a rapid control of the approximate vertical line. The exit aperture (10) for the light beam may be provided with a screen or a scale to render possible angle markings and stopping-down in certain directions. The deflection device may be driven by belt, cogwheels or by a motor with a bored axle, so that the light aperture (10) can be placed near the bottom of the protective casing, which may be suitable, for example, in the control of floors. The same effect can be achieved by two concentric cone-cylindric prisms about the light aperture. A light aperture at low height is suitable also for reducing the risk of eye damages by a strong laser. This risk is reduced also when an automatic switch or shutter prevents light from being produced or emitted when the deflection device does not rotate.

When plane or cone-shaped reference surfaces are desired with an inclination greatly deviating from the horizontal plane, the light source is rigidly secured in the protective casing, which is given the desired direction or inclination by means of spirit level, bubble, plumb or reference points, through which the desired reference surface is adjusted.

What we claim is:

1. Apparatus for producing an optical reference surface by deflection of a primary light beam, said apparatus comprising a rotatable light deflecting means, a light source means for producing said primary light beam, flexible means for suspending said light source means as a pendulum directing said light beam towards said light deflecting means substantially vertically in the position of rest of said pendulum, and said flexible means comprising at least two members which are respectively flexible in a perpendicular relationship to one another for pendulating said light source means sideways in any direction.

2. An arrangement according to claim 1 incorporating an electrically powered light source means and in which said flexible means are electrically conductive for serving as electric lead-in lines for said light source means.

3. An arrangement according to claim 1 in which each of said members comprises a thin leaf spring.

4. An arrangement according to claim 1 in which said light deflecting means is a 90° reflecting prism rotatable on an axis in substantial alignment with said pendulum.

5. An arrangement according to claim 4 in which said pendulum is mounted in a casing and said prism is supported by said casing separately from said pendulum.

6. An arrangement according to claim 1, in which said pendulum is mounted in a casing, and magnetic means are provided in said casing for damping the oscillations of said pendulum.

7. An arrangement according to claim 1 in which said pendulum is mounted in a casing, and electromagnet means mounted in said casing deflects said pendulum from the vertical line.

8. An arrangement according to claim 4, in which said pendulum is mounted in a tubular external casing and a conically cylindrical prism is mounted on said casing about said rotatable prism for deflecting said light beam from the substantially horizontal plane.

9. Apparatus for producing an optical reference surface by deflection of a primary light beam, said apparatus comprising a rotatable light deflecting means, a light source means for producing said primary light beam, flexible means for suspending said light source means as a pendulum directing said light beam towards said light deflecting means substantially vertically in position of rest of said pendulum, and said flexible means comprising laterally spaced electrical conductors pendulating said light source means sideways in any direction.

10. An arrangement according to claim 9 in which said flexible means comprise at least two laterally spaced conductors, said conductors being adapted to flex in a perpendicular relationship to one another.

* * * * *

PO-1050
(5/69)

UNITED STATES PATENT OFFICE
CERTIFICATE OF CORRECTION

Patent No. 3,771,876          Dated November 13, 1973

Inventor(s) ERLAND SAMUEL LJUNGDAHL and LARS AXEL EKSTROM

It is certified that error appears in the above-identified patent and that said Letters Patent are hereby corrected as shown below:

Foreign Application Priority Data

November 18, 1970   Sweden. . . . . . . . . .15571/70

Signed and sealed this 16th day of April 1974.

(SEAL)
Attest:

EDWARD M. FLETCHER, JR.
Attesting Officer

C. MARSHALL DANN
Commissioner of Patents